(12) United States Patent
Park

(10) Patent No.: US 8,310,925 B2
(45) Date of Patent: Nov. 13, 2012

(54) APPARATUS AND METHOD FOR TRANSMITTING DATA IN CUSTOMER PREMISES EQUIPMENT

(75) Inventor: Byung-Tae Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1042 days.

(21) Appl. No.: 12/263,708

(22) Filed: Nov. 3, 2008

(65) Prior Publication Data

US 2009/0129351 A1      May 21, 2009

(30) Foreign Application Priority Data

Nov. 16, 2007   (KR) .................. 10-2007-0117444

(51) Int. Cl.
*H04J 3/14* (2006.01)
(52) U.S. Cl. ................. 370/230; 370/465
(58) Field of Classification Search ................... None
See application file for complete search history.

(56) References Cited

U.S. PATENT DOCUMENTS

| | | |
|---|---|---|
| 7,050,546 B1 | 5/2006 | Richardson et al. |
| 2003/0067903 A1 | 4/2003 | Jorgensen |
| 2005/0281220 A1 | 12/2005 | Stanwood et al. |
| 2007/0019959 A1* | 1/2007 | Retnasothie et al. .......... 398/115 |
| 2007/0201367 A1* | 8/2007 | Chen et al. ..................... 370/235 |
| 2009/0147792 A1* | 6/2009 | Anschutz et al. ......... 370/395.21 |
| 2011/0194411 A1* | 8/2011 | Croft et al. ..................... 370/235 |
| 2011/0249645 A1* | 10/2011 | Spinar et al. .................. 370/329 |

FOREIGN PATENT DOCUMENTS

| | | |
|---|---|---|
| KR | 10-2002-0035650 A | 5/2002 |
| KR | 10-2007-0032365 A | 3/2007 |
| KR | 10-2007-0053203 A | 5/2007 |

* cited by examiner

*Primary Examiner* — Kevin C Harper
(74) *Attorney, Agent, or Firm* — Jefferson IP Law, LLP

(57) ABSTRACT

An apparatus and method are provided for transmitting data by a Customer Premises Equipment (CPE) that communicates with a first communication equipment supporting a first communication protocol and a second communication equipment supporting a second communication protocol. The apparatus and method includes receiving data packets from the second communication equipment, determining a data grant interval of the first communication equipment according to a preset Quality of Service (QoS) scheme of the first communication equipment, determining an amount of data to be transmitted for the data grant interval, collecting data packets from the received data packets below the determined amount of transmission data, and transmitting the collected data packets to the first communication equipment every data grant interval.

20 Claims, 4 Drawing Sheets

APPARATUS AND METHOD FOR TRANSMITTING DATA IN CUSTOMER PREMISES EQUIPMENT

PRIORITY

This application claims the benefit under 35 U.S.C. §119 (a) of a Korean patent application filed on Nov. 16, 2007 in the Korean Intellectual Property Office and assigned Serial No. 10-2007-0117444, the entire disclosure of which is hereby incorporated by reference.

BACKGROUND OF THE INVENTION

1. Field of the Invention

The present invention relates to transmitting data in a Customer Premises Equipment (CPE). More particularly, the present invention relates to an apparatus and method in which a CPE adjusts the amount of its transmission data according to a Quality of Service (QoS) scheme.

2. Description of the Related Art

Generally, the term "CPE" refers to equipment which is installed on a customer's premises to connect user equipment such as telephones, various data terminal equipment, personal computers, multiplexing equipment and a private branch exchange to a transmission line of a public communication provider.

The CPE is adapted to perform communication between a first communication equipment and a second communication equipment. Herein, the term "first communication equipment" refers to communication equipment that follows a first communication protocol, and the first communication protocol, which is a communication protocol based on the Institute of Electrical and Electronics Engineers (IEEE) 802.16e standard, can include a Worldwide Interoperability for Microwave Access (WiMAX) or Wireless Broadband (WiBro) communication protocol. The term "second communication equipment" refers to communication equipment that follows a communication protocol different from the first communication protocol. The communication protocol different from the first communication protocol, which includes communication protocols based on IEEE 802.1x standards, can include a Transmission Control Protocol/Internet Protocol (TCP/IP) communication protocol.

Currently, however, when the CPE transmits data packets received from the second communication equipment to the first communication equipment, it transmits the data without considering a QoS scheme of the first communication equipment, thus failing to guarantee QoS of the data and to ensure normal execution of communication.

Further, the CPE cannot immediately transmit the data received from the second communication equipment to the first communication equipment, thus causing a time delay. Therefore, a need exists for a CPE that is able to adjust transmission according to a QoS of the first communication equipment.

SUMMARY OF THE INVENTION

An aspect of the present invention is to address at least the above-mentioned problems and/or disadvantages and to provide at least the advantages described below. Accordingly, an aspect of the present invention is to provide an apparatus and method in which, when a CPE transmits data received from a second communication equipment to a first communication equipment, it adjusts the amount of transmission data according to a QoS scheme of the first communication equipment.

Another aspect of the present invention is to provide an apparatus and method in which a CPE adjusts the amount of data received from a second communication equipment in real time according to a QoS scheme of a first communication equipment, and transmits the amount-adjusted data to the first communication equipment.

According to an aspect of the present invention, a method for transmitting data by a Customer Premises Equipment (CPE) that communicates with a first communication equipment supporting a first communication protocol and a second communication equipment supporting a second communication protocol is provided. The method includes receiving data packets from the second communication equipment, determining a data grant interval of the first communication equipment according to a preset Quality of Service (QoS) scheme of the first communication equipment, determining an amount of data to be transmitted for the data grant interval, collecting data packets from the received data packets below the determined amount of transmission data and transmitting the collected data packets to the first communication equipment every data grant interval.

According to another aspect of the present invention, an apparatus for transmitting data in a Customer Premises Equipment (CPE) is provided. The apparatus includes a first communication modem for performing communication between the CPE and a first communication equipment supporting a first communication protocol, a second communication modem for performing communication between the CPE and a second communication equipment supporting a second communication protocol and a controller for controlling the second communication modem and the first communication modem, for receiving data packets through the second communication modem, for determining a data grant interval of the first communication equipment according to a preset Quality of Service (QoS) scheme of the first communication equipment, for determining an amount of data to be transmitted for the data grant interval, for collecting data packets from the received data packets below the determined amount of transmission data and for outputting the collected data packets to the first communication modem every data grant interval.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to exemplary embodiments of the present invention, when transmitting data packets received from a second communication equipment to a Base Station (BS), a Customer Premises Equipment (CPE) determines the amount of transmission data to be transmitted for a data grant interval according to a QoS scheme of the BS, and transmits the received data packets to the BS below the determined amount of transmission data for the data grant interval. Thus, the CPE can adaptively transmit data packets according to the QoS scheme of the BS. The term 'data grant interval' as used herein refers to a time period for which data transmission is granted.

Figure 1:
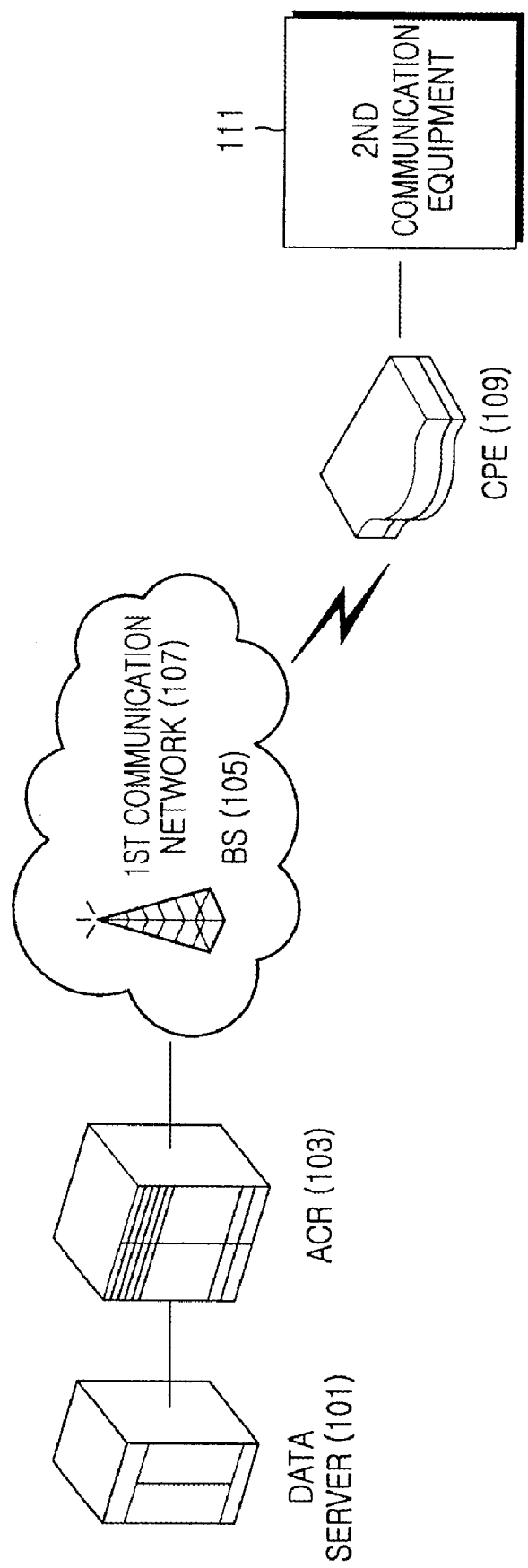
FIG. 1 is a diagram illustrating a configuration of a communication system according to an exemplary embodiment of the present invention.

FIG. 1 is a diagram illustrating a configuration of a communication system according to an exemplary embodiment of the present invention.

Referring to FIG. 1, the communication system includes a data server 101, an Access Control Router (ACR) 103, a BS 105, a first communication network 107, a CPE 109, and a second communication equipment 111.

The data server 101, which includes a database containing data, searches the database for data in response to a request from the second communication equipment 111 and transmits the searched data to the ACR 103. The data server 101 also receives data from the second communication equipment 111 and stores the received data in the database. The ACR 103 includes equipment for guaranteeing a data rate higher than or equal to a threshold level when exchanging a large volume of multimedia data. The ACR 103 transmits data received from the data server 101 to the BS 105, or transmits data received from the BS 105 to the data server 101.

The BS 105 transmits data from the ACR 103 to the CPE 109 via the first communication network 107 according to a first communication protocol, or transmits data received from the CPE 109 via the first communication network 107 to the ACR 103. In this example, the BS 105 can be called a first communication equipment, since it is equipment that follows the first communication protocol. In an exemplary embodiment, the first communication protocol, which is a communication protocol based on the IEEE 802.16e standard, can include a WiMAX or a WiBro communication protocol.

According to exemplary embodiments of the present invention, when a QoS scheme of the first communication (or the first communication equipment) is changed, the BS 105 generates QoS scheme change information indicating the change in QoS scheme, and transmits the QoS scheme change information to the CPE 109. In an exemplary implementation, the BS 105 can transmit the QoS scheme change information using a Medium Access Control (MAC) message. The term 'first communication' as used herein refers to communication between the BS 105 and the CPE 109.

If the first communication protocol is an 802.16e communication protocol, the QoS scheme is determined by QoS parameters associated with a scheduling service. That is, for the BS 105, its QoS scheme is determined according to QoS parameters associated with the currently set scheduling service among the scheduling services supported by the 802.16e communication protocol. Therefore, when the BS 105 changes the scheduling service, it can be considered that the QoS scheme is changed.

Exemplary scheduling services include Unsolicited Grant Service (UGS), real-time Polling Service (rtPS), non-real-time Polling Service (nrtPS), and Best Effort Service (BES), each of which is intended for a particular type of a data flow.

The UGS is a service that supports real-time service flows that periodically generate data packets having a fixed size, e.g., voice data packets used for performing Voice over IP (VoIP). The rtPS is a service that supports real-time service flows that periodically generate data having a fixed size, e.g., video data used for processing moving pictures. Further, the nrtPS is a service that supports non-real-time service flows that request data burst types (i.e. Grant Burst Types) having a variable size on a regular basis, and the BES is a service that provides an efficient service using best-efforts for the given traffic conditions.

For example, in an exemplary case in which the BS 105 follows the IEEE 802.16e-based communication protocol and the currently set scheduling service is UGS, if at least one of an unsolicited grant interval and a burst size, which are parameters of the scheduling service, is changed, the BS 105 can generate QoS scheme change information including the changed information among the changed unsolicited grant interval information and the changed burst size information, and transmit the QoS scheme change information to the CPE 109.

The second communication equipment 111 refers to equipment used by the end user. More specifically, the second communication equipment 111 includes communication equipment that follows communication protocols that are different from the first communication protocol. At the request of the end user, the second communication equipment 111 receives data stored in the data server 101 via the CPE 109, or transmits data stored in or generated by the second communication equipment 111 to the data server 101 via the CPE 109. Herein, the communication protocols used by the second communication equipment 111 and based on IEEE 802.1x, which are different from the first communication protocol, can include a Transmission Control Protocol/Internet Protocol (TCP/IP) communication protocol. Examples of second communication equipment 111 that follow the TCP/

IP communication protocol include an IP camera, a navigation terminal, a Personal Digital Assistant (PDA), etc.

The CPE 109 includes equipment for connecting the BS 105 to the second communication equipment 111 to provide communication therebetween. In particular, the CPE 109 receives data packets from the second communication equipment 111 and determines a data grant interval and the amount of transmission data transmittable to the BS 105 for the data grant interval, according to a QoS scheme of a preset first communication protocol. Further, the CPE 109 adjusts the amount of the received data packets below the determined amount of transmission data, and transmits the amount-adjusted data packets to the BS 105 every data grant interval.

Figure 2:
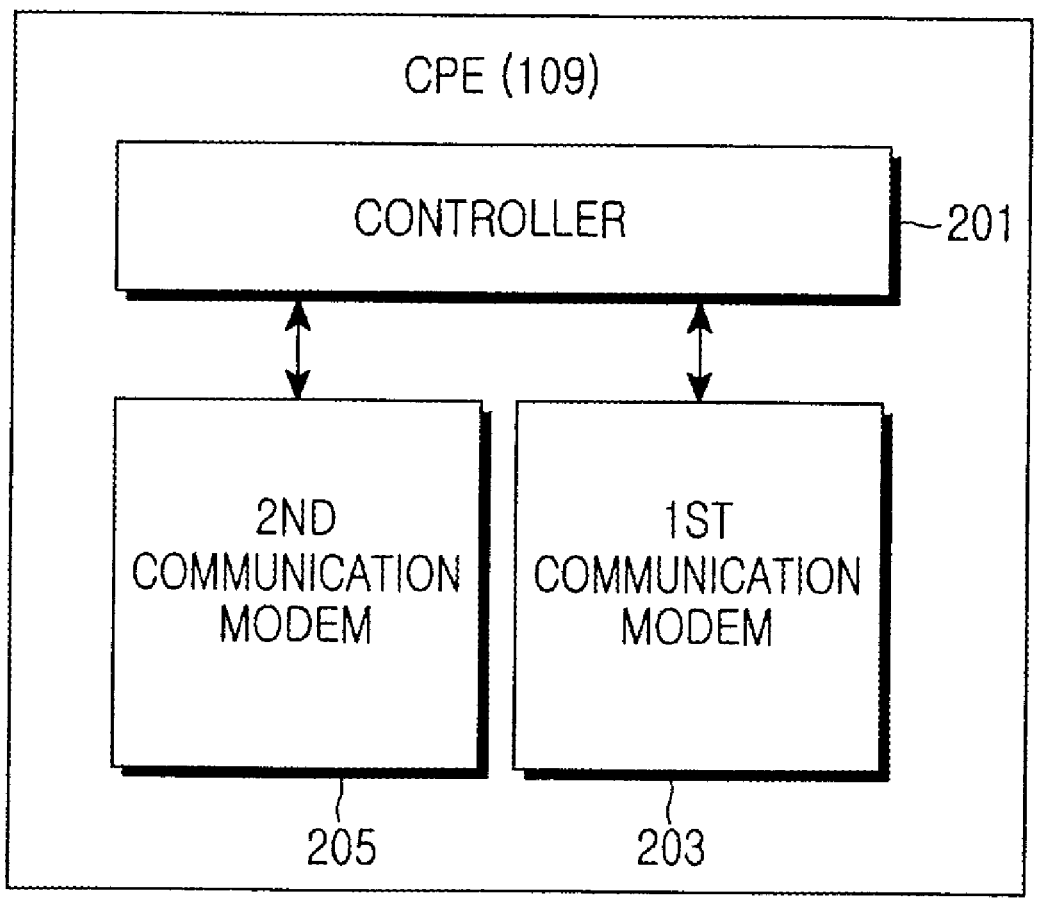
FIG. 2 is a block diagram illustrating a structure of a CPE according to an exemplary embodiment of the present invention.

With reference to FIG. 1, the elements of the communication system have been described so far. With reference to FIG. 2, a description will now be made of a structure of a CPE according to an exemplary embodiment of the present invention.

FIG. 2 is a block diagram illustrating a structure of a CPE 109 according to an exemplary embodiment of the present invention. Referring to FIG. 2, the CPE 109 includes a controller 201, a first communication modem 203, and a second communication modem 205.

The first communication modem 203, under the control of the controller 201, performs communication with the BS 105, and transmits data packets to the BS 105 or receives data packets from the BS 105. The second communication modem 205, under the control of the controller 201, performs communication with the second communication equipment 111, and transmits data packets to the second communication equipment 111 or receives data packets from the second communication equipment 111.

The controller 201 controls the first communication modem 203 and the second communication modem 205, and outputs the data packets received via the first communication modem 203 to the second communication modem 205, or outputs the data packets received via the second communication modem 205 to the first communication modem 203.

In particular, upon receiving QoS scheme change information from the BS 105, the controller 201 analyzes the received QoS scheme change information and resets the QoS scheme corresponding to the BS 105 that is currently set in the CPE as necessary. When transmitting the data packets of the second communication equipment 111, received through the first communication modem 203, to the BS 105 through the second communication modem 205, the controller 201 detects the QoS scheme currently set in the CPE that corresponds to the BS 105, and determines a data grant interval and the amount of transmission data transmittable for the data grant interval, according to the detected QoS scheme. The controller 201 adjusts the amount of the received data packets to a level below the determined amount of transmission data, and outputs the amount-adjusted data packets to the first communication modem 203 for the data grant interval.

For example, in a case where the controller 201 determines the data grant interval and the amount of transmission data, if the BS 105 follows the IEEE 802.16e-based communication protocol, the currently set scheduling service is UGS, the minimum reserved traffic rate (MIN_RESERVED_RATE) among the parameters of UGS is 16 Mbyte/s, and a burst size (Burst_Size) is set to 16000 bits, the controller 201 can calculate the data grant interval, or an unsolicited grant interval (GRANT_INTERVAL) using Equation (1), $$\text{MIN\_RESERVED\_RATE}/(200/\text{GRANT\_INTERVAL}/5) < \text{Burst\_Size} \quad (1)$$

where MIN_RESERVED_RATE denotes a minimum reserved traffic rate, GRANT_INTERVAL denotes an unsolicited grant interval and Burst_Size denotes a burst size for UGS.

If the CPE 109 calculates an unsolicited grant interval using Equation (1), the unsolicited grant interval is derived as 5 ms, which means that the CPE 109 can transmit data of 8750 bits or less to the BS 105 for 5 ms, and a size of the transmission data should be less than the burst size of 16000 bits. Therefore, the controller 201 can adjust the data packets received through the second communication modem 205 to a level (8750 bits) below the amount of transmission data and output the adjusted data packets to the first communication modem 203 for the data grant interval of 5 ms.

Figure 3:
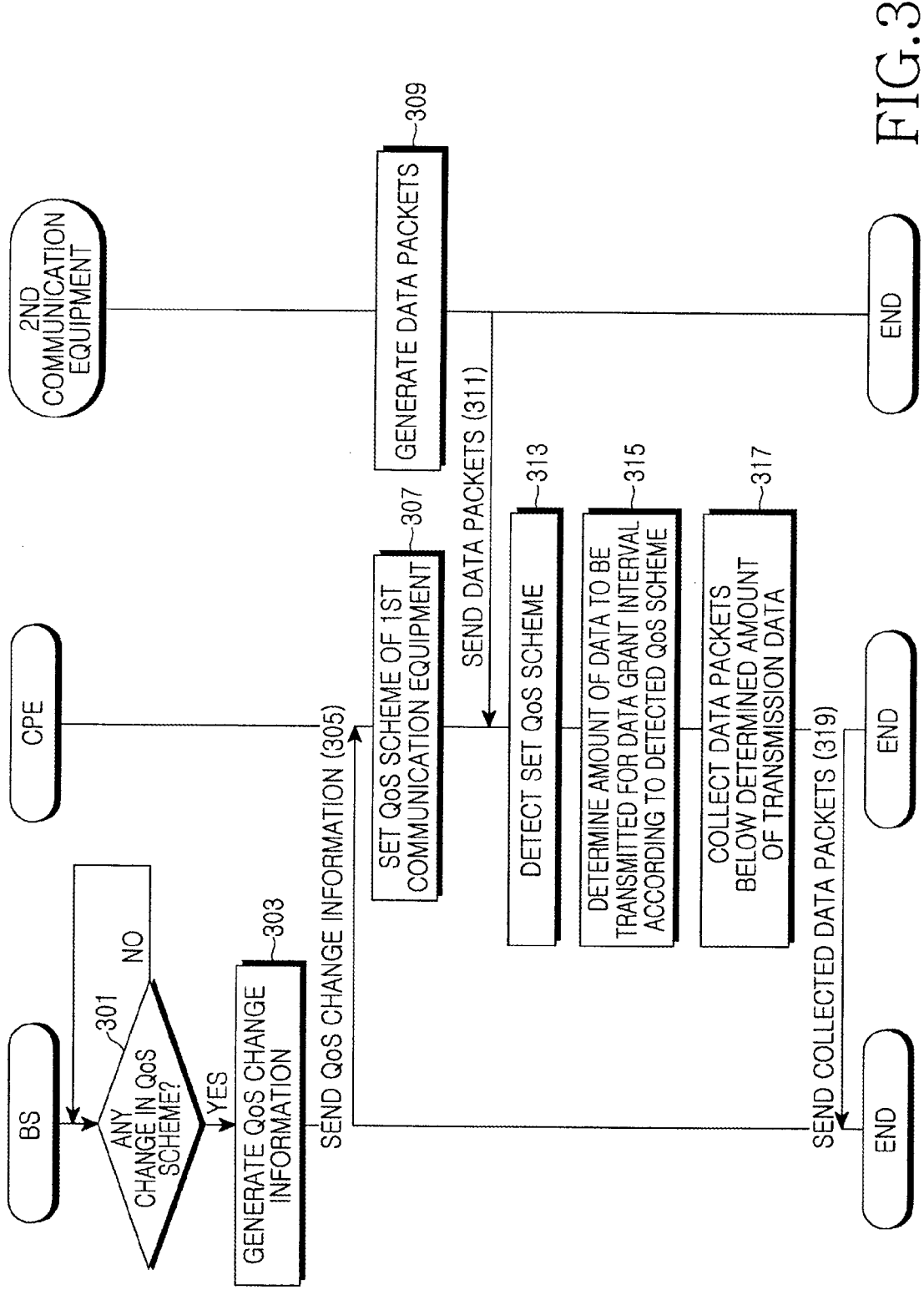
FIG. 3 is a flowchart illustrating a method for adjusting an amount of transmission data packets according to a QoS scheme of a first communication equipment in a communication system according to an exemplary embodiment of the present invention.

FIG. 3 is a flowchart illustrating a method for adjusting the amount of transmission data packets according to a QoS scheme of a first communication equipment in a communication system according to an exemplary embodiment of the present invention.

Referring to FIG. 3, in step 301, a BS determines if its QoS scheme has changed. If the BS determines that its QoS scheme has changed, it proceeds to step 303 and otherwise, the BS continues to repeat step 301. As an example of the determination of step 301, in a case where the BS performs communication based on the 802.16e communication protocol, the BS determines that a QoS scheme has changed and proceeds to step 303 when a preset scheduling service is changed to another scheduling service or QoS-related parameters among the parameters of the preset scheduling service are changed.

For example, in the case where the BS supports the 802.16e communication protocol and the preset scheduling service is rtPS, when the rtPS is changed to UGS, the BS can proceed to step 303. As another example, in the case where the BS supports the 802.16e communication protocol and the preset scheduling service is UGS, if at least one of the minimum reserved traffic rate, the unsolicited grant interval and the burst size among the parameters of UGS is changed, the BS can proceed to step 303.

In step 303, the BS generates QoS scheme change information according to the information that was determined to have changed in step 301. Thereafter, in step 305, the BS transmits the generated QoS scheme change information to the CPE.

More specifically, if it is determined in step 301 that QoS-related parameters among the parameters of the preset scheduling service are changed, the BS generates QoS scheme change information including information indicating the changed parameters, and transmits the generated QoS scheme change information to the CPE. For example, in the case where the BS supports the 802.16e communication protocol and the preset scheduling service is UGS, if either or both of the unsolicited grant interval and the burst size among the parameters of UGS are changed, the BS can generate QoS scheme change information including unsolicited grant interval information indicating the changed unsolicited grant interval and burst size information indicating the changed burst size, and transmit the generated QoS scheme change information.

In step 307, the CPE receives the QoS scheme change information, and updates the QoS scheme of the BS using the received QoS scheme change information. For example, when the QoS scheme change information includes unsolicited grant interval information and burst size information of UGS, the CPE can set a QoS scheme used when it transmits data to the BS, according to the unsolicited grant interval information and the burst size information.

In step 309, if transmission of data is requested by a user, the second communication equipment generates data packets by packetizing the data. In step 311, the second communication equipment transmits the generated data packets to the CPE.

In step 313, the CPE receives the data packets, and detects a QoS scheme of the BS that was set in step 307. In step 315, the CPE determines a data grant interval of the BS and the amount of transmission data to be transmitted for the data grant interval, according to the detected QoS scheme.

In step 317, the CPE collects data packets received from the second communication equipment below the determined amount of transmission data. In step 319, the CPE transmits the collected data packets to the BS every data grant interval. Hereafter, the exemplary procedure is ended.

Figure 4:
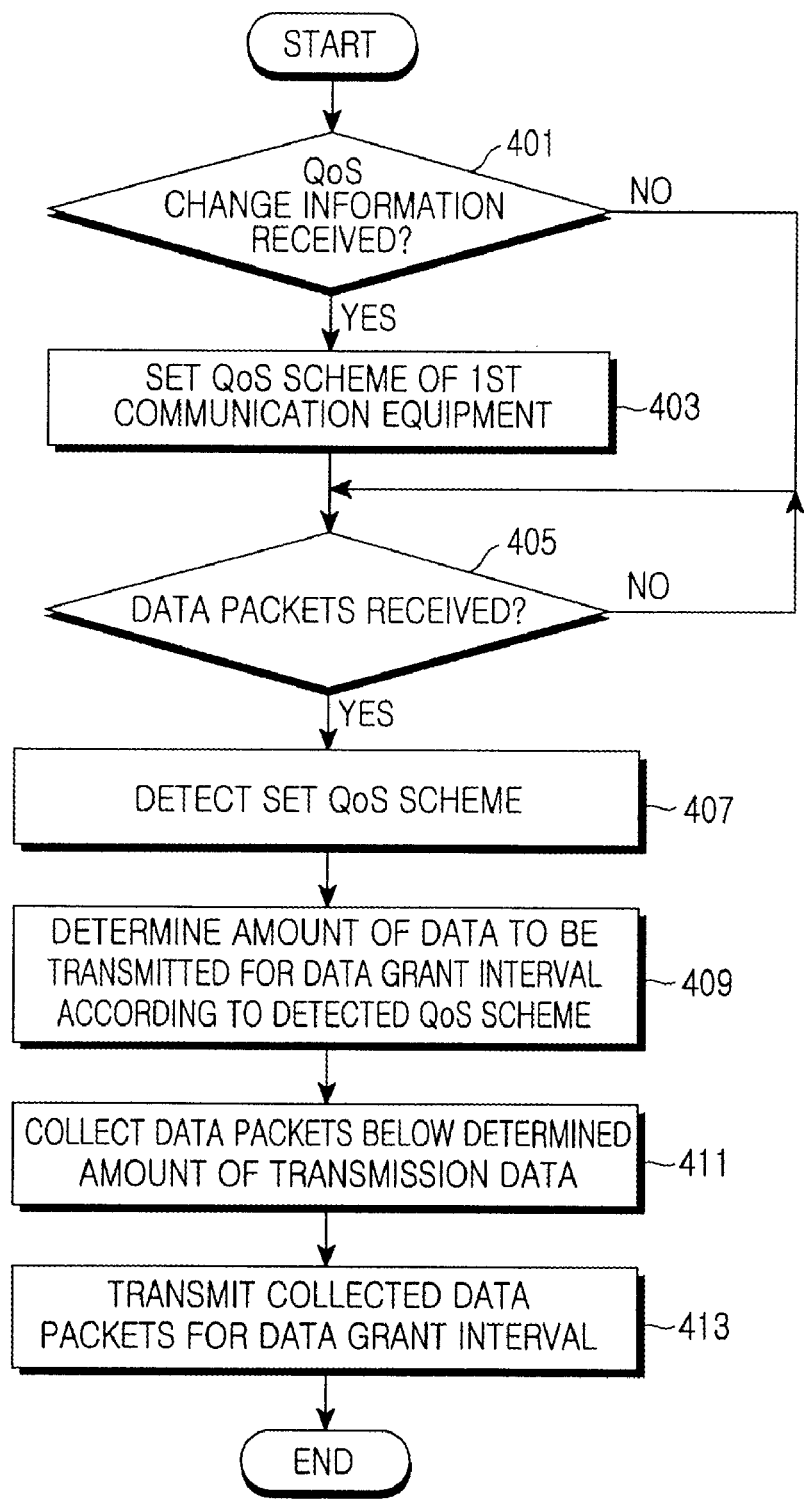
FIG. 4 is a flowchart illustrating a method for adjusting, by a CPE, an amount of transmission data packets according to a QoS scheme of a first communication equipment according to an exemplary embodiment of the present invention.

An exemplary operation of adjusting the amount of transmission data packets according to a QoS scheme of a first communication equipment in a communication system has been described so far with reference to FIG. 3. With reference to FIG. 4, a description will now be made of an operation of adjusting, by a CPE, the amount of transmission data packets according to a QoS scheme of a first communication equipment according to an exemplary embodiment of the present invention.

Referring to FIG. 4, in step 401, the CPE determines if it has received QoS scheme change information from a BS. If the CPE determines it has received the QoS scheme change information, it proceeds to step 403. Alternatively, the CPE proceeds to step 405 if it has not received the QoS scheme change information. The QoS scheme change information, which is information indicating a change in a QoS scheme of the BS, may include the changed QoS scheme-related information. In an exemplary implementation, the CPE may receive a MAC message including the QoS scheme change information.

For example, in the case where the CPE supports the 802.16e communication protocol and a preset scheduling service is UGS, if at least one of an unsolicited grant interval and a burst size among the parameters of UGS is changed, the BS generates QoS scheme change information including unsolicited grant interval information indicating the changed unsolicited grant interval and burst size information indicating the changed burst size, and transmits the generated QoS scheme change information. Herein, the unsolicited grant interval information and the burst size information are the QoS scheme-related information. The CPE receives the QoS scheme change information including the unsolicited grant interval information and the burst size information.

In step 403, the CPE determines a QoS scheme of the BS by analyzing the received QoS scheme change information, and updates a previously stored QoS scheme of the BS using the determined QoS scheme.

In step 405, the CPE determines if it has received data packets from the second communication equipment. The CPE proceeds to step 407 if has received the data packets, and repeats step 405 if it has not received the data packets.

In step 407, the CPE detects a previously stored QoS scheme of the BS. In step 409, the CPE determines a data grant interval and the amount of transmission data to be transmitted for the data grant interval, according to the detected QoS scheme.

For example, in the process of determining the data grant interval and the amount of transmission data, if the BS follows the IEEE 802.16e-based communication protocol, the currently set scheduling service is UGS, the minimum reserved traffic rate among the parameters of UGS is 16 Mbyte/s, and the burst size is set to 16000 bits, then the CPE can determine the data grant interval, or an unsolicited grant interval, using Equation (1). Therefore, the CPE can determine the data grant interval of 5 ms and the amount, 8750 bits, of transmission data.

In step 411, the CPE collects data packets received from the second communication equipment below the determined amount of transmission data. In step 413, the CPE transmits the collected data packets to the BS every data grant interval.

As described above, the CPE can adjust the amount of transmission data packets received from the second communication equipment according to the QoS scheme of the BS. Thus, when transmitting the data packets received from the second communication equipment to the first communication equipment, the CPE can transmit the data packets according to the QoS scheme of the BS, thereby guaranteeing QoS and facilitating smooth communication between the second communication equipment and the BS. Further, the CPE adjusts the amount of transmission data received from the second communication equipment in real-time according to the QoS scheme of the first communication equipment, and transmits the amount-adjusted data to the first communication equipment, contributing to a decrease in communication time delay between the second communication equipment and the BS.

While the invention has been shown and described with reference to exemplary embodiments thereof, it will be understood by those skilled in the art that various changes in form and details may be made therein without departing from the spirit and scope of the invention as defined by the appended claims and their equivalents. For example, although a description of the present invention has been provided in which the CPE adjusts the amount of transmission data according to the QoS scheme of the BS, the present invention can be applied not only to the BS but also to any communication equipment supporting the QoS scheme. In addition, although a description of the present invention has been made using an example in which the BS supports the 802.16e communication protocol and the scheduling service is set as UGS, the present invention can be applied even to the case where another scheduling service is set. Further, although a description of an exemplary embodiment is directed herein to an example where the CPE detects the QoS scheme of the BS using the QoS scheme information of the BS, stored in the CPE, the CPE can also obtain the QoS scheme from the BS by communicating with the BS in real-time. The CPE may request that the BS transmit the QoS scheme for obtaining the QoS scheme.

As is apparent from the foregoing description, according to exemplary embodiments of the present invention, when transmitting data received from the second communication equipment to the first communication equipment, the CPE adjusts the amount of transmission data according to the QoS scheme of the first communication equipment, thereby guaranteeing QoS and facilitating smooth communication.

In addition, according to exemplary embodiments of the present invention, the CPE adjusts the amount of data received from the second communication equipment in real-time according to the QoS scheme of the first communication equipment, and transmits the amount-adjusted data to the first communication equipment, contributing to a decrease in communication time delay.

What is claimed is:

1. A method for transmitting data by a Customer Premises Equipment (CPE) that communicates with a first communication equipment supporting a first communication protocol and a second communication equipment supporting a second communication protocol, the method comprising:

receiving data packets from a second communication equipment;

determining a data grant interval of a first communication equipment according to a Quality of Service (QoS) scheme of the first communication equipment;

determining an amount of data to be transmitted to the first communication equipment for the data grant interval;

adjusting an amount of data packets received from the second communication equipment such that the received data packets collectively have an amount of data which is less than the determined amount of transmission data; and transmitting the adjusted amount of data packets of the data packets received from the second communication equipment to the first communication equipment every data grant interval.

2. The method of claim 1, further comprising:

receiving, from the first communication equipment, QoS scheme change information indicating a change in the QoS scheme of the first communication equipment; and updating a previously stored QoS scheme of the first communication equipment using the received QoS scheme change information.

3. The method of claim 2, wherein the receiving of the QoS scheme change information comprises receiving a Medium Access Control (MAC) message which includes the QoS scheme change information.

4. The method of claim 2, wherein the QoS scheme change information includes at least one of the data grant interval and a burst size.

5. The method of claim 2, wherein the determining of the data grant interval of the first communication equipment according to the QoS scheme of the first communication equipment comprises:

detecting the updated QoS scheme and determining the data grant interval by using the detected QoS scheme.

6. The method of claim 1, wherein the determining of the data grant interval of the first communication equipment according to the QoS scheme of the first communication equipment comprises obtaining the QoS scheme by communicating with the first communication equipment in real time.

7. The method of claim 1, wherein the preset QoS scheme comprises at least one of Unsolicited Grant Service (UGS), real-time Polling Service (rtPS), non-real-time Polling Service (nrtPS) and Best Effort Service (BES).

8. The method of claim 1, wherein the first communication protocol is based on an Institute of Electrical and Electronics Engineers (IEEE) 801.16e communication protocol.

9. The method of claim 1, wherein the second communication protocol is based on an IEEE 801.1x communication protocol.

10. An apparatus for transmitting data in a Customer Premises Equipment (CPE), the apparatus comprising:

a first communication modem for performing communication between a CPE and a first communication equipment supporting a first communication protocol;

a second communication modem for performing communication between the CPE and a second communication equipment supporting a second communication protocol; and a controller for controlling the second communication modem and the first communication modem, for receiving data packets through the second communication modem, for determining a data grant interval of the first communication equipment according to a Quality of Service (QoS) scheme of the first communication equipment, for determining an amount of data to be transmitted to the first communication equipment for the data grant interval, for adjusting an amount of data packets received from the second communication equipment such that the received packets collectively have an amount of data which is less than the determined amount of transmission data, and for outputting the adjusted amount of data packets of the data packets received from the second communication equipment to the first communication modem every data grant interval.

11. The apparatus of claim 10, wherein the controller receives, from the first communication equipment, QoS scheme change information indicating a change in the QoS scheme of the first communication equipment, and updates a previously stored QoS scheme of the first communication equipment using the received QoS scheme change information.

12. The apparatus of claim 11, wherein the controller receives the QoS scheme change information by receiving a Medium Access Control (MAC) message which includes the QoS scheme change information.

13. The apparatus of claim 11, wherein the QoS scheme change information includes at least one of the data grant interval and a burst size.

14. The apparatus of claim 11, wherein the controller detects the updated QoS scheme and determines the data grant interval by using the detected QoS scheme.

15. The apparatus of claim 10, wherein the controller obtains the QoS scheme by communicating with the first communication equipment in real time.

16. The apparatus of claim 10, wherein the preset QoS scheme comprises at least one of Unsolicited Grant Service (UGS), real-time Polling Service (rtPS), non-real-time Polling Service (nrtPS) and Best Effort Service (BES).

17. The apparatus of claim 10, wherein the first communication protocol is based on an Institute of Electrical and Electronics Engineers (IEEE) 801.16e communication protocol.

18. The apparatus of claim 10, wherein the second communication protocol is based on an IEEE 801.1x communication protocol.

19. The apparatus of claim 11, wherein the controller adjusts the amount of data packets received from the second communication equipment based on the change in QoS scheme of the first communication equipment.

20. The method of claim 2, wherein the amount of data packets received from the second communication equipment is adjusted based on the change in QoS scheme of the first communication equipment.

* * * * *